US012222552B2

(12) United States Patent
Huang et al.

(10) Patent No.: US 12,222,552 B2
(45) Date of Patent: Feb. 11, 2025

(54) PHOTONIC WAVELENGTH DIVISION MULTIPLEXING (WDM) RECEIVER WITH POLARIZATION DIVERSITY AND/OR LOW REFLECTANCE

(71) Applicant: Intel Corporation, Santa Clara, CA (US)

(72) Inventors: Duanni Huang, San Jose, CA (US); Saeed Fathololoumi, Los Gatos, CA (US); Meer Nazmus Sakib, Berkeley, CA (US); Mohammad Montazeri Najafabadi, San Lorenzo, CA (US); Chaoxuan Ma, Sunnyvale, CA (US); David Hui, Santa Clara, CA (US); Taehwan Kim, Berkeley, CA (US); Ling Liao, Santa Clara, CA (US); Hao Li, Hillsboro, OR (US); Ganesh Balamurugan, Hillsboro, OR (US); Haisheng Rong, Pleasanton, CA (US); Aliasghar Eftekhar, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 848 days.

(21) Appl. No.: 17/133,347

(22) Filed: Dec. 23, 2020

(65) Prior Publication Data

US 2021/0149115 A1    May 20, 2021

(51) Int. Cl.
*H04B 10/66*    (2013.01)
*G02B 6/26*    (2006.01)
(Continued)

(52) U.S. Cl.
CPC ............ *G02B 6/272* (2013.01); *G02B 6/266* (2013.01); *G02B 6/2766* (2013.01);
(Continued)

(58) Field of Classification Search
None
See application file for complete search history.

(56) References Cited

U.S. PATENT DOCUMENTS 6,175,668 B1    1/2001    Borrelli et al.
7,492,983 B2 *    2/2009    Matsubara ......... G02B 6/12007
                                                        385/14
(Continued)

FOREIGN PATENT DOCUMENTS

WO    2019-219215 A1    11/2019

OTHER PUBLICATIONS

Smartoptics, Coarse and Dense Wavelength Division Multiplexing, 2018 (Year: 2018).*

(Continued)

*Primary Examiner* — Jai M Lee
(74) *Attorney, Agent, or Firm* — Schwabe, Williamson & Wyatt, P.C.

(57) ABSTRACT

The present disclosure is directed to photonic wavelength division multiplexing (WDM) receivers with polarization diversity and/or low reflectance. In embodiments, a WDM receiver is provided with a splitter, a plurality of waveguides and a plurality of photodetectors in series. The waveguides having particular equal path lengths relationship from the splitter to respective ones of the photodetectors. In other embodiments, the WDM receiver is provided with a splitter, a looped waveguide, a plurality of photodetectors, and a plurality of variable optical attenuators (VOAs). The VOAs are configured to suppress reflection of signal beams back to the transmitter. In various embodiments, the WDM receiver is a receiver sub-assembly of a silicon photonic transceiver disposed in a silicon package. Other embodiments may be described and/or claimed.

22 Claims, 12 Drawing Sheets

(51) Int. Cl.
   *G02B 6/27* (2006.01)
   *H04J 14/06* (2006.01)
(52) U.S. Cl.
   CPC ........... *G02B 6/2773* (2013.01); *H04B 10/66* (2013.01); *H04J 14/06* (2013.01)

(56) References Cited

U.S. PATENT DOCUMENTS

| | | | | |
|---|---|---|---|---|
| 7,505,648 | B2* | 3/2009 | Klein | G02B 6/29343 |
| | | | | 385/11 |
| 9,256,084 | B2* | 2/2016 | Kato | H04J 14/06 |
| 9,584,246 | B2* | 2/2017 | Jeong | G02B 6/29397 |
| 9,832,552 | B2* | 11/2017 | Lee | H04Q 11/0005 |
| 11,709,319 | B2* | 7/2023 | Bhargava | H04B 10/60 |
| | | | | 385/24 |
| 11,811,499 | B1* | 11/2023 | Maharry | H04B 10/614 |
| 2008/0123188 | A1* | 5/2008 | Klein | G02B 6/29343 |
| | | | | 359/487.04 |
| 2015/0260914 | A1* | 9/2015 | Zheng | G02B 6/12007 |
| | | | | 385/11 |
| 2017/0214472 | A1 | 6/2017 | Caplan et al. | |
| 2017/0223437 | A1 | 8/2017 | Lee et al. | |
| 2020/0021384 | A1 | 1/2020 | Stojanovic et al. | |

OTHER PUBLICATIONS

Dong et al., "Reconfigurable Four-Channel Polarization Diversity Silicon Photonic WDM Receiver," Optical Fiber Communication Conference. Optical Society of America, (2015), 3 pages.

Li et al., "40 GB/s All-Silicon Photodetector Based on Microring Resonators," IEEE Photonics Technology Letters, vol. 27, No. 7, Apr. 1, 2015, 4 pages.

Park et al., "Ring resonator based polarization diversity WDM receiver," Optics Express 27.5 (2019), 11 pages.

Sakib et al., "A 112 Gb/s all-silicon micro-ring photodetector for datacom applications," Optical Fiber Communication Conference, Optical Society of America, 2020, 3 pages.

Geuzebroek et al., "8 Ring-Resonator-Based Wavelength Filters," Apr. 11, 2006, Springer Series in Optical Sciences 123:341-379, 40 pages.

International Search Report and Written Opinion mailed Jan. 10, 2022 for International Application No. PCT/US2021/051561, 11 pages.

International Preliminary Report on Patentability mailed Jul. 6, 2023 for International Application No. PCT/US2021/051561, 7 pages.

* cited by examiner

520

```
┌─────────────────────────────────────────┐
│ Split a received multi-wavelength       │
│ polarization diverse beam into two      │
│ multi-wavelength polarized beams        │
│ using a polarization splitter           │
│ 522                                     │
└─────────────────────────────────────────┘
                    ↓
┌─────────────────────────────────────────┐
│ Guide the two multi-wavelength          │
│ polarized beams to a plurality of       │
│ photodetectors disposed in series       │
│ 524                                     │
└─────────────────────────────────────────┘
                    ↓
┌─────────────────────────────────────────┐
│ Filter both multi-wavelength polarized  │
│ beams for the various wavelengths at    │
│ corresponding ones of the plurality     │
│ of photodetectors                       │
│ 526                                     │
└─────────────────────────────────────────┘
                    ↓
┌ ─ ─ ─ ─ ─ ─ ─ ─ ─ ─ ─ ─ ─ ─ ─ ─ ─ ─ ─ ┐
  Configure VOA to eliminate or reduce
│           reflectance                   │
                   528
└ ─ ─ ─ ─ ─ ─ ─ ─ ─ ─ ─ ─ ─ ─ ─ ─ ─ ─ ─ ┘
```

FIG. 5B

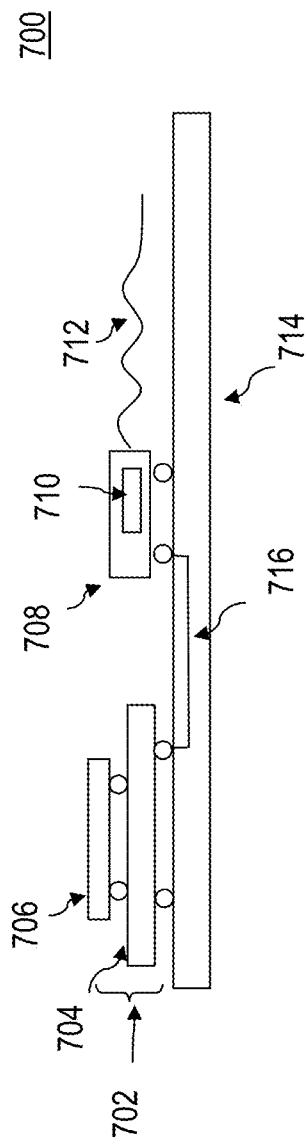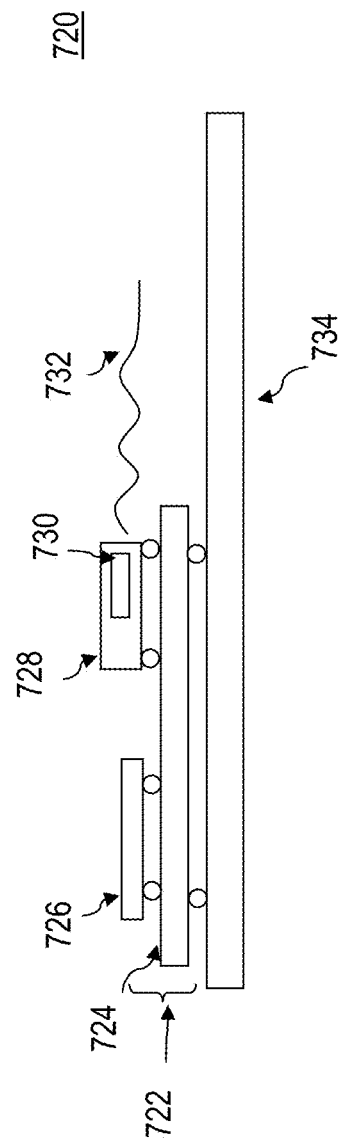
FIG. 7A
FIG. 7B

PHOTONIC WAVELENGTH DIVISION MULTIPLEXING (WDM) RECEIVER WITH POLARIZATION DIVERSITY AND/OR LOW REFLECTANCE

TECHNICAL FIELD

Embodiments of the present disclosure generally relate to the fields of photonic receivers, in particular, to silicon photonic wavelength-division multiplexing (WDM) receivers with polarization diversity and/or low reflectance.

BACKGROUND

In optical communications, WDM is a technology which multiplexes a number of optical carrier signals onto a single optical fiber by using different wavelengths of laser light. This technique enables bi-directional communications over one strand of fiber, as well as multiplication of capacity. WDM systems may be generally divided into normal WDM, coarse WDM or dense WDM (DWDM) depending on the number of wavelengths (channels) provided, and the spacing between the wavelengths.

Silicon photonic, the use of silicon as optical medium, is an emerging optical technology for data communications. The silicon is usually patterned with sub-micrometer precision, into microphotonic components. It has attracted increasing attention during the last decades due to its compatibility with the mature silicon fabrication technology and miniaturization of the optical functionalities and systems. Because silicon is already used as the substrate for most integrated circuits, it is possible to create hybrid devices in which the optical and electronic components are integrated onto a single microchip. Consequently, silicon photonics is being actively researched by many electronics manufacturers.

A silicon photonic transceiver typically includes a transmitter sub-assembly and a receiver sub-assembly. As adoption of silicon photonic transceiver increases, to compensate for polarization drifts in fibers in low power and low cost applications, polarization diverse receivers are needed. At the same time, wavelength de-multiplexing is also desired in order to increase the aggregate bandwidth and bandwidth density of the link.

Further, as the Moore's law scales number of transistors and parallel cores, the data input/output (IO) becomes the bottleneck. Optical transceivers provide high IO bandwidth density and shoreline density, where signal is modulated using DWDM in multiple wavelengths on each bus. Each optical chip can use multiple of these DWDM channel instances. However, a significant challenge in enabling compact optical circuit to scale many wavelengths in one optical fiber/bus is to efficiently separate different wavelengths at the receiver side (de-multiplexing) for both transverse magnetic (TM) and transverse electric (TE) modes.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 5B illustrates an example process for photonic WDM receiving with polarization diversity, in accordance with some embodiments.

FIGS. 7A and 7B illustrate example embodiments of packaging the photonic WDM receiver of the present disclosure, according to some embodiments.

DETAILED DESCRIPTION

Figure 1:
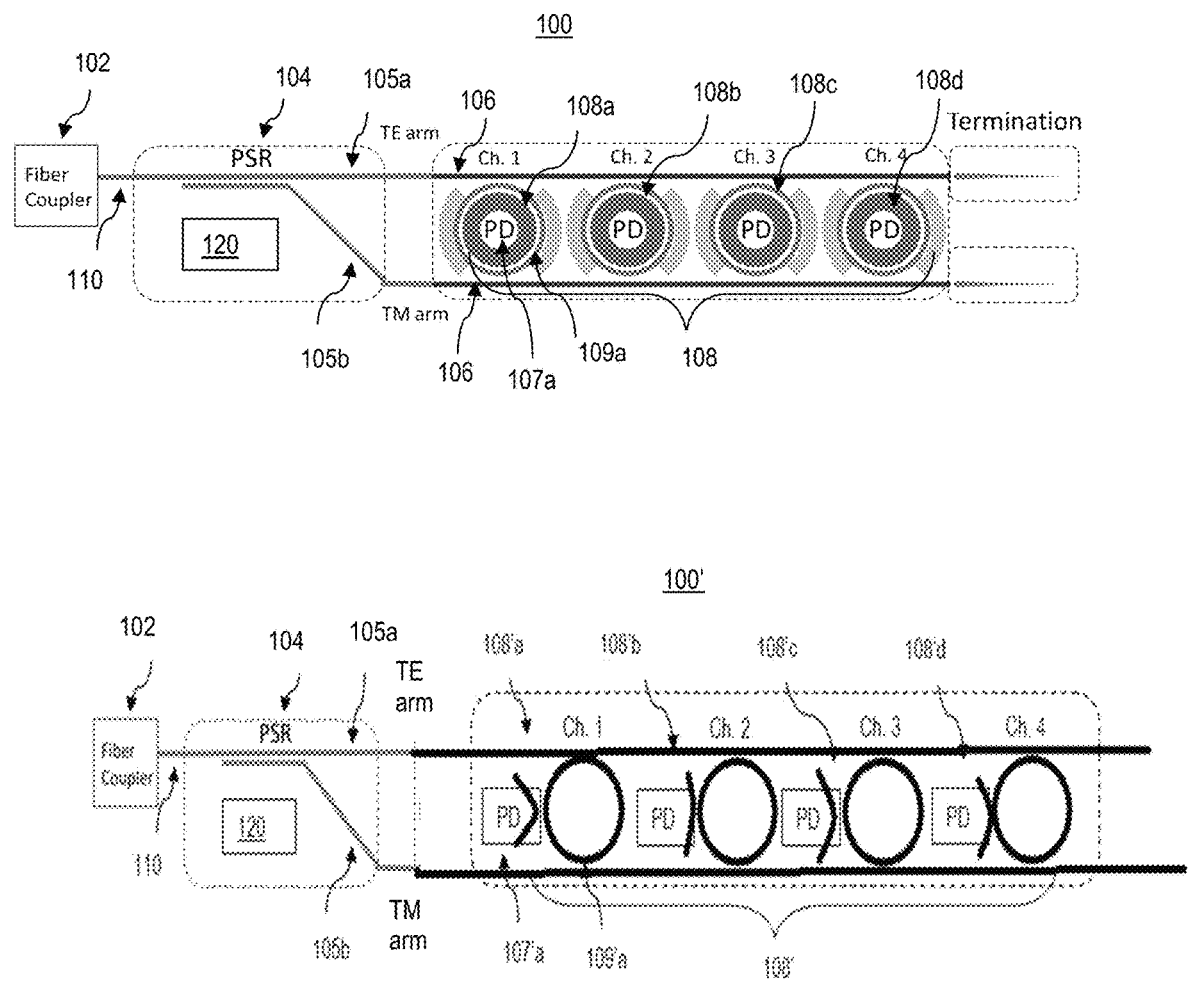
FIG. 1 illustrates various example photonic WDM receivers with polarization diversity, in accordance with some embodiments.

Embodiments described herein are directed to photonic WDM receivers with polarization diversity, in particular, silicon photonic WDM receivers disposed in a silicon package with photodetectors having silicon micro ring resonator complemented photodiodes, adapted to compensate for polarization drifts in fibers in low power and low cost applications. Silicon micro ring resonator complemented photodiodes are attractive for wavelength selective receivers. However, micro ring resonator complemented photodiodes are inherently polarization sensitive. Disclosed herein are WDM receivers with micro ring resonator complemented photodiodes that are particularly arranged to satisfy both the polarization diversity as well as wavelength selectivity.

In embodiments, a photonic WDM receiver is provided with a splitter, a plurality of photodetectors, and a plurality of waveguides. The splitter is arranged to split a received multi-wavelength light beam into a first polarized multi-wavelength light beam and a second polarized multi-wavelength light beam. The received multi-wavelength light beam has data encoded in a plurality of wavelengths for a plurality of channels. The plurality of photodetectors are optically coupled with the splitter to receive the first and second polarized multi-wavelength light beams, and respectively filter both the first and second polarized multi-wavelength light beams for corresponding ones of the plurality of wavelengths, to receive the data encoded therein for the channels. The plurality of waveguides are arranged to couple and guide the first and second polarized multi-wavelength light beams from the splitter to the plurality of photodetectors, with same path lengths to each of the plurality of photodetectors. In embodiments, the photonic WDM receiver is a silicon photonic WDM receiver disposed in a silicon package.

In some embodiments, the splitter is a polarization splitter (PS). In other embodiments, the splitter is a polarization splitter and rotator (PSR). In some embodiments, the photodetectors are silicon micro ring resonator complemented photodiodes. The photodiodes may be disposed inside the silicon micro ring resonator or outside, adjacent to the silicon micro ring resonator.

Embodiments described herein are directed to photonic WDM receivers with photodetectors, in particular, silicon photonic WDM receivers with photodetectors having micro ring resonator photodiodes, adapted to efficiently separate different wavelengths at the receiver side (de-multiplexing) for both TM and TE modes to enable scaling of many wavelengths in one optical fiber/bus. The embodiments provide a compact solution for de-multiplexing many wavelengths at the receiver for both polarizations. The embodiments are optimized for minimal reflection to the transmitter and, at the same time, able to incorporate both polarizations of the lasers, thereby improves efficiency of the receiver and reduces the transmitter requirements.

In embodiments, a photonic WDM receiver is provided with a splitter, a looped waveguide, a plurality of photodetectors and a first and a second variable optical attenuator (VOAs). The splitter is arranged to receive a multi-wavelength light beam from a transmitter, and split the received multi-wavelength light beam into a first multi-wavelength light beam and a second multi-wavelength light beam. The received multi-wavelength light beam having data encoded in a plurality of wavelengths for a plurality of channels. The loop waveguide optically couples the first and second multi-wavelength light beams from the splitter to respective ones of the photodetectors. The plurality of photodetectors are respectively disposed adjacent to the looped waveguide to demux the plurality of wavelengths. The first and second variable optical attenuator (VOAs) are respectively disposed at a first location of the looped waveguide between the splitter and a first of the photodetectors, and at a second location of the looped waveguide between the splitter and a second of the photodetectors to suppress reflection of the first and second multi-wavelength light beams back to the transmitter. In embodiments, the photonic WDM receiver is a silicon photonic WDM receiver disposed in a silicon package.

In embodiments, the splitter is a polarization splitter rotator (PSR). Further, the looped waveguide is a primary looped waveguide, and each of the photodetectors includes a silicon micro ring resonator, a photodiode, and a secondary looped waveguide optically coupling the particular silicon micro ring resonator and photodiode pair.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Referring now to FIG. 1, wherein example photonic WDM receivers with polarization diversity, in accordance with some embodiments, are shown. As illustrated in the upper portion of FIG. 1, example photonic WDM receiver 100, in accordance with some embodiments, includes fiber coupler 102, a splitter 104, a plurality of photodetectors 108, and a plurality of waveguides 106, optically coupled with each other as shown. In embodiments, the photonic WDM receiver 100 is a silicon photonic WDM receiver disposed in a silicon package. Splitter 104 may also be referred to as polarization splitter or polarization beam splitter. The lower portion of FIG. 1 illustrates alternate embodiments of example photonic WDM receiver 100'. Photonic WDM receiver 100' comprises a plurality of photodetectors 108' that are different in their constitutions than the plurality of photodetectors 108 of photonic WDM receiver 100'.

Coupler 102 is arranged to couple a multi-wavelength light beam 110 from a fiber to splitter 104. Multi-wavelength light beam 110 has data encoded in a plurality of wavelengths for a plurality of channels. Splitter 104 is arranged to split multi-wavelength light beam 110 into a first polarized multi-wavelength light beam and a second polarized multi-wavelength light beam. In embodiments, splitter 104 is a polarization splitter and rotator (PSR). PSR 104 is arranged to split multi-wavelength light beam 110 into a traverse electric (TE) arm 105a to provide the first traverse electric (TE) multi-wavelength light beam and a traverse magnetic (TM) arm 105b, and then rotate the split beam in the TM arm, to provide the second polarized multi-wavelength light beam.

The plurality of photodetectors 108 are optically coupled with splitter 104 to receive the first and second polarized multi-wavelength light beams, and respectively filter both the first and second polarized multi-wavelength light beams for corresponding ones of the plurality of wavelengths, to receive the data encoded therein for the channels. In embodiments, photodetectors 108 or 108' are arranged in a series, with each photodetector 108a/108b/108c/108d or 108'a/108'b/108'c/108'd arranged to filter both the first and second polarized multi-wavelength light beams for a particular wavelength/channel.

In embodiments, photodetectors 108 and 108' are silicon micro ring resonator complemented photodiodes arranged in a series. For example, photodetector 108a comprises photodiode 107a disposed at the center of silicon micro ring resonator 109a. In alternate embodiments, photodetector 108'a comprises photodiode 107'a disposed at a side, adjacent to silicon micro ring resonator 109'a. For the illustrated embodiments, four silicon micro ring resonator complemented photodiodes 108a-108d (or 108'a-108'd) arranged in series are shown, one for each wavelength/channel. However, the present disclosure is not so limited. Any number of silicon micro ring resonator complemented photodiodes may be provided. For example, in some embodiments, WDM receiver 100 may be a dense WDM (DWDM) receiver having over 40 silicon micro ring resonator complemented photodiodes to demux over 40 wavelengths for more than 40 channels, with spacing between wavelengths that is less than 100 GHz.

The plurality of waveguides 106 are arranged to couple and guide the first and second polarized multi-wavelength light beams from the splitter 104 to the plurality of photodetectors 108, with same path lengths to each of the plurality of photodetectors 108, to be described more fully below.

In embodiments, splitter 104 may optionally be provided with heater 120 to facilitate control of splitter 104 and adjust any path length difference.

Figure 2:
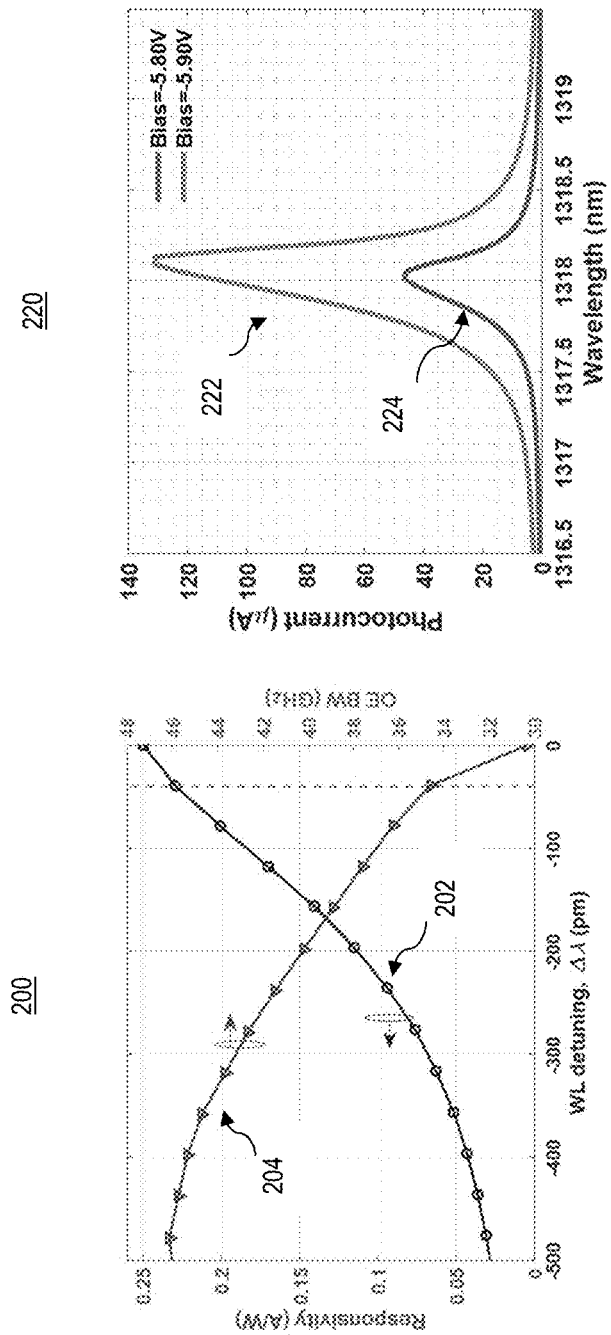
FIG. 2 illustrates typical performance of a silicon micro ring resonator photodetector, in accordance with some embodiments.

FIG. 2 illustrates typical performance of a silicon micro ring resonator complemented photodiode, in accordance with some embodiments. More specifically, left portion 200 of FIG. 2 illustrates typical performance of a silicon micro ring resonator complemented photodiode in terms of bandwidth and responsivity, and right portion 220 of FIG. 2 illustrates photocurrents of a silicon micro ring resonator complemented photodiode for different wavelengths and biases. As shown in left portion 200 of FIG. 2, responsivity 202 of a silicon micro ring resonator complemented photodiode (in ampere/watt (a/w)) rises as wavelength detuning ($\Delta\lambda$) (in pico meter (pw)) increases, whereas optoelectronic bandwidth (OE BW) 204 of a silicon micro ring resonator complemented photodiode (in GHz) decreases as wavelength detuning ($\Delta\lambda$) (in pico meter (pw)) increases. Further, as shown in right portion 220 of FIG. 2, there is a clear peak in photocurrent (in micro ampere ($\mu$A)) when a silicon micro ring resonator complemented photodiode is on resonance. Right portion 220 of FIG. 2 illustrates two such peaks for two bias voltages across the micro ring resonator complemented photodiodes. Plot 222 is for bias at 5.9v, and plot 224 is for bias at 5.8v.

Figure 3:
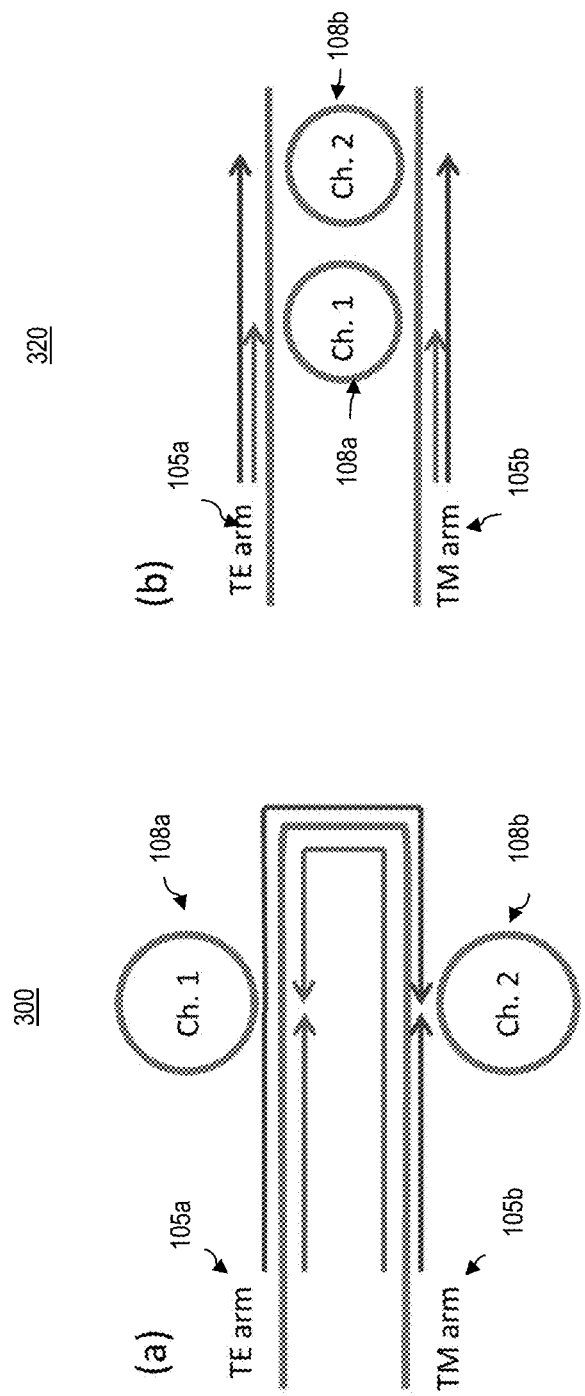
FIG. 3 illustrates signal path lengths to each silicon micro ring resonator photodetector, in accordance with some embodiments.

FIG. 3 illustrates provision of equal length signal paths to each silicon micro ring resonator complemented photodiode, in accordance with some embodiments. As illustrated in left portion 300 of FIG. 3, there is an inherent imbalance in path length to each micro ring resonator complemented photodiode between the polarized multi-wavelength light beam of the TE arm 105a and the polarized multi-wavelength light beam of the TM arm 105b. However, waveguides 106 and respective silicon micro ring resonator complemented photodiodes 108a-108d are arranged in a manner such that the path lengths to each micro ring resonator complemented photodiode 108a/108b/108c/108d between the polarized multi-wavelength light beam of the TE arm 105a and the polarized multi-wavelength light beam of the TM arm 105b are equal, as illustrated in the right portion 320 of FIG. 3. The light beam in the TE and TM arms travel equal distances before reaching each ring. This holds true even when the number of rings is increased beyond what is depicted here.

In embodiments, photonic WDM receiver 100 is packaged in one photonic integrated circuit. In embodiments, photonic WDM receiver 100 is a silicon photonic WDM receiver. In embodiments, photonic WDM receiver 100 is part of a receiver subassembly section of a photonic transceiver. In embodiments, the photonic transceiver is part of an optical engine.

Thus, embodiments of a novel photonic WDM receiver with polarization diversity adapted to compensate for polarization drifts in fibers in low power and low cost applications has been described. Prior solutions that involve the use of micro ring resonator complemented photodetectors have either not addressed polarization diversity or addressed the issue inefficiently. One reported prior solution involves the use of separate wavelength filters for the traverse electric (TE) and traverse magnetic (TM) modes. Such approach has the disadvantage of increasing complexity of the implementation. Another reported solution involves using shared wavelength filter for TE and TM polarization, filtering the beams on the TE and TM arms at different time. However, the reported solution suffers from imbalanced group delay between various channels, which limits the achievable data rates for the receiver.

Figure 4:
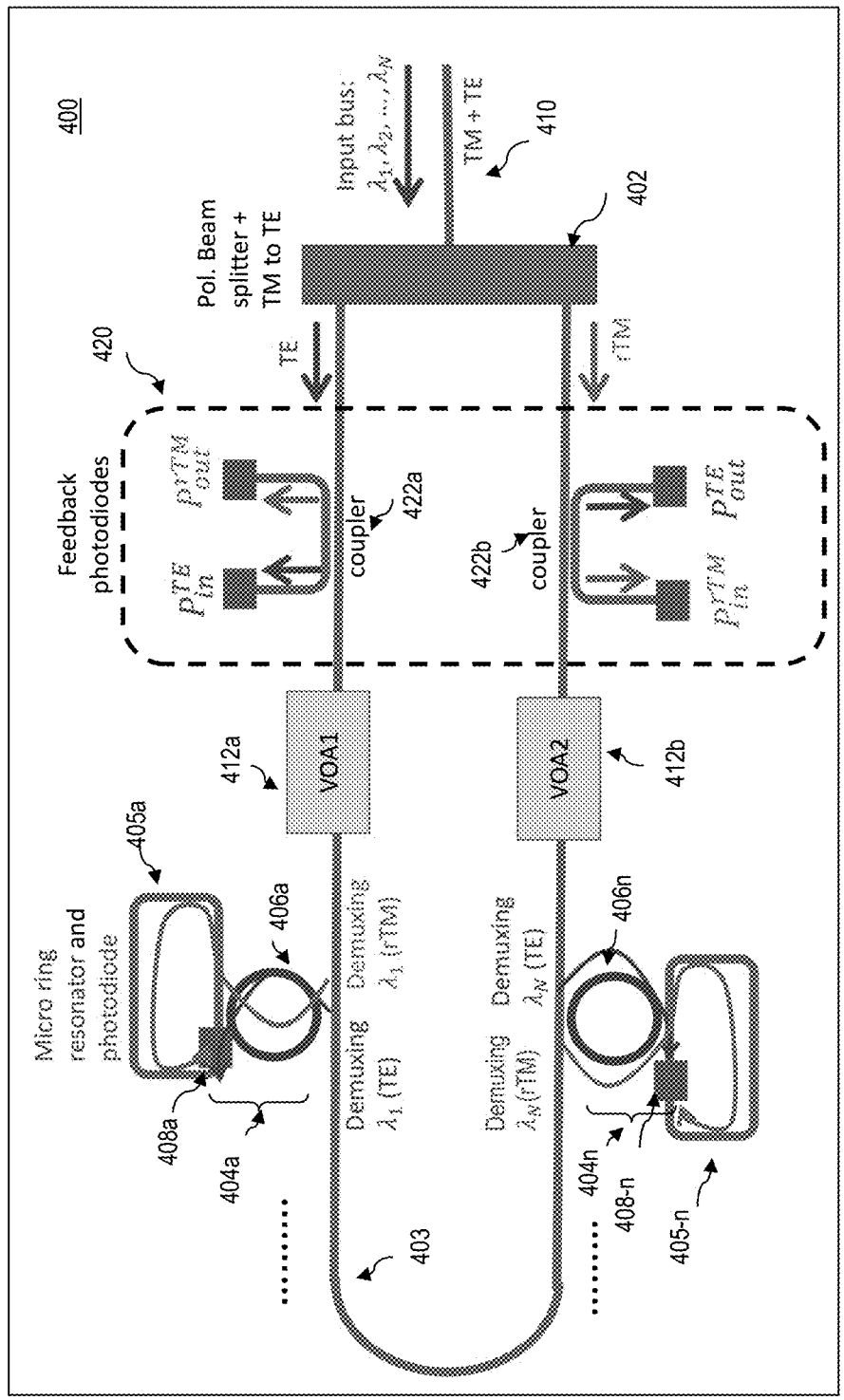
FIG. 4 illustrates another example photonic WDM receiver with low reflectance, in accordance with some embodiments.

FIG. 4 illustrates another example photonic WDM receiver with low reflectance, in accordance with some embodiments. As illustrated, example photonic WDM receiver 400 includes splitter 402, a plurality of photodetectors 404a-404n, a primary looped waveguide 403, and a pair of variable optical attenuators (VOAs) 408a-408b, optically coupled with each other as shown. In embodiments, photonic WDM receiver 400 may further include a feedback structure 420 having a number of photocurrent sensors 422a and 422b. In embodiments, the photonic WDM receiver 400 is a silicon photonic WDM receiver disposed in a silicon package.

Splitter 402 is arranged to receive a multi-wavelength light beam 410 from a fiber. Multi-wavelength light beam 410 has data encoded in a plurality of wavelengths for a plurality of channels. More specifically, for the illustrated embodiments, multi-wavelength light beam 410 has data encoded in N wavelengths ($\lambda_1$ through $\lambda_N$) for N channels, where N is an integer. Further, splitter 402 is arranged to split multi-wavelength light beam 410 into a first polarized multi-wavelength light beam and a second polarized multi-wavelength light beam. In embodiments, splitter 402 is a polarization splitter and rotator (PSR). PSR 402 is arranged to split multi-wavelength light beam 410 into a traverse electric (TE) arm to provide the first traverse electric (TE) multi-wavelength light beam and a traverse magnetic (TM) arm, and then rotate the split beam in the TM arm, to provide the second polarized multi-wavelength light beam (rTM).

The plurality of photodetectors 404a-404n are optically coupled with PSR 402 to receive the first and second polarized multi-wavelength light beams, and respectively filter both the first and second polarized multi-wavelength light beams for corresponding ones of the plurality of wavelengths, to receive the data encoded therein for the channels. In embodiments, photodetectors 404a-404n are optically coupled to PSR 402 via primary looped waveguide 403, with each photodetector 404a-404n arranged to filter both the first and second polarized multi-wavelength light beams for a particular wavelength/channel. For the illustrated embodiments, the first polarized multi-wavelength light beam is guided to the photodetectors 404a-404n is a counterclockwise direction along the looped waveguide 403, while the second polarized multi-wavelength light beam is guided to the photodetectors 404a-404n in a clockwise direction along the looped waveguide 403.

In embodiments, each photodetector 404a-404n comprises a photodiode 408a-408n complemented by corresponding micro ring resonators 406a-406n and secondary looped waveguides 405a-405n. Details of two photodetectors 404a and 404n, each with a photodiode 408a/408n complemented by a corresponding micro ring resonator 406a/406n and a secondary looped waveguide 405a/405n are explicitly illustrated in FIG. 4. The photodetectors (having respectively photodiodes, micro ring resonators and secondary waveguides) for wavelength $\lambda_2$ through $\lambda_{n-1}$ are represented by the ellipses in FIG. 4.

The two polarization beams are launched from the respective micro ring resonators 406a-406n into the secondary looped waveguides 405a-405n where one is propagated in one direction with the other propagated in the opposite direction. More specifically, for photodetectors disposed at the TE arm side of primary looped waveguide 403, e.g., photodetector 404a, the polarization beam from the TE arm is propagated in the micro ring resonator, e.g., 406a, in the counterclockwise direction, with the polarization beam from the rTM arm propagated in the micro ring resonator, e.g., 406a, in the clockwise direction. Whereas, for photodetectors disposed at the rTM arm side of primary looped waveguide 403, e.g., photodetector 404n, the polarization beam from the TE arm is propagated in the micro ring resonator, e.g., 406n, in the clockwise direction with the polarization beam from the rTM arm propagated in the micro ring resonator, e.g., 406n, in the counterclockwise direction. In some embodiments, the secondary waveguides 405a-405n are arranged in a manner, such that both polarization beams arrived at the corresponding photodiodes 408a/408n at substantially the same time, so both polarization beams from the TE and rTM arms are filtered for a wavelength together.

Still referring to FIG. 4, for the illustrated embodiments, a pair of variable optical attenuators (VOAs) 412a-412b are provided to eliminate or reduce reflectance of the polarization beams back to the transmitter of the received multi-wavelength light beam. In some embodiments, an optional feedback structure 420 having a plurality of photocurrent sensors 422a-422b for measuring the photocurrents of the polarization beams in the inbound and outbound directions for both TE and rTM arms is also provided. When provided, the measured photocurrents may assist in the configuration of VOAs 412a-412b to eliminate or reduce reflectance of the polarization beams back to the transmitter. Various example processes for configuring VOAs 412a-412b to eliminate or reduce reflectance of the polarization beams back to the transmitter are described below with references to FIG. 5C-5D.

In embodiments, one or more photonic WDM receivers 400 are packaged in one photonic integrated circuit. In embodiments, photonic WDM receiver 400 is a silicon photonic WDM receiver. In embodiments, photonic WDM receiver 400 is part of a receiver subassembly section of a photonic transceiver. In embodiments, the photonic transceiver is part of an optical engine.

Figure 5A:
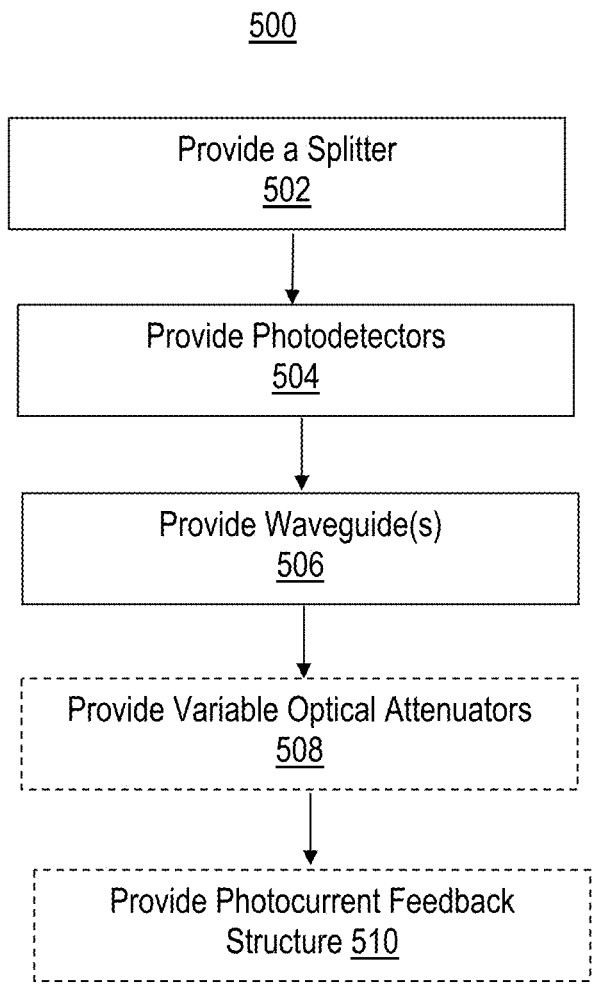
FIG. 5A illustrates an example process for making a photonic WDM receiver with polarization diversity and/or low reflectance, in accordance with some embodiments.

FIG. 5A illustrates an example process for making a photonic WDM receiver, e.g., one of the WDM receivers earlier described, with polarization diversity and/or low reflectance, in accordance with some embodiments. As illustrated example process 500 for making a photonic WDM receiver with polarization diversity and/or low reflectance for a system/circuit may include the operations performed at blocks 502-506, and optionally, operations performed at blocks 508-510. In embodiments, the operations are performed as part of a silicon process to form a silicon package.

At block 502, a splitter configured to split a received multi-wavelength beam encoded with data for multiple channels into two polarized multi-wavelength beams, e.g., as described above, may be provided in accordance with the requirement of the system/circuit. In embodiments, the splitter may be a PSR that splits the received multi-wavelength beam into a traverse electric (TE) polarized multi-wavelength light beam, and a traverse magnetic (TM) polarized multi-wavelength light beam. In some embodiments, the traverse magnetic (TM) polarized multi-wavelength light beam may be rotated into a rotated TM polarized multi-wavelength light beam.

At block 504, a plurality of photodetectors to filter and demux corresponding ones of the wavelengths of the polarized beams may be provided in accordance with the requirement of the system/circuit. For the embodiments of FIG. 1, photodetectors having micro ring resonator complemented photodiodes may be provided. For the embodiments of FIG. 4, photodetectors having micro ring resonators and secondary looped waveguides complemented photodiodes may be provided. Each secondary looped waveguide is arranged such that both polarized beams arrive at the corresponding photodiode at the same time.

At block 506, one or more waveguides to guide the split polarized multi-wave beams from the splitter to the photodetectors may be provided in accordance with the requirement of the system/circuit. For the embodiments of FIG. 1, a pair of parallel waveguides may be provided. The waveguides are arranged to provide the same path lengths for both polarized beams to each photodetector. For the embodiments of FIG. 4, a primary looped waveguide may be provided.

At block 508, to eliminate or reduce reflectance of the polarized beams back to the transmitter of the received multi-wavelength light beam, such as for the embodiments of FIG. 4, VOAs to regulate operation of the WDM receiver may be provided in accordance with the requirement of the system/circuit.

At block 510, to complement the provision of VOAs, such as for some of the embodiments of FIG. 4, a feedback structure, e.g., one of the feedback structures earlier described, with photocurrent sensors to measure photocurrents in both inbound and outbound directions for both polarized beams may be provided in accordance with the requirement of the system/circuit. As earlier described, in some embodiments, the photocurrent sensors may be photodiodes.

FIG. 5B illustrates an example process for photonic WDM receiving with polarization diversity, in accordance with some embodiments. As illustrated, example process 520 for photonic WDM receiving with polarization diversity may include operations performed at blocks 522-526, and optionally, operations performed at block 528.

At block 522, a received multi-wavelength polarization diverse light beam may be split into a first and a second polarized multi-wavelength light beam. For example, the first polarized multi-wavelength light beam may be a first traverse electric (TE) polarized multi-wavelength light beam, and the second polarized multi-wavelength light beam may be a traverse magnetic (TM) polarized multi-wavelength light beam rotated into a second TE polarized multi-wavelength light beam.

At block 524, the first and second polarized multi-wavelength light beams may be guided to a plurality of photodetectors to filter and demux the various wavelengths for a plurality of channels. In embodiments, the first and second polarized multi-wavelength light beams may be successively guided in parallel by a pair of parallel waveguides to a plurality of photodetectors arranged in series. The first and second polarized multi-wavelength light beams are provided with equal path lengths to each of the plurality of photodetectors.

In other embodiments, the first and second polarized multi-wavelength light beams may be guided separately in opposite direction by a looped waveguide to a plurality of photodetectors arranged around the looped waveguide. Each of the plurality of photodetectors has a secondary waveguide to facilitate same time arrival of the first and second polarized multi-wavelength light beams at the corresponding photodiode of the particular photodetector.

At block 526, both of the first and second polarized multi-wavelength light beams are respectively filtered by each of the plurality of photodetectors.

At block 528, if provided, VOAs may be configured to suppress/reduce reflectance of the polarized multi-wavelength light beams back to the transmitter of the received multi-wavelength light beams, to be described more fully below with references to FIGS. 5C and 5D.

Figure 5C:
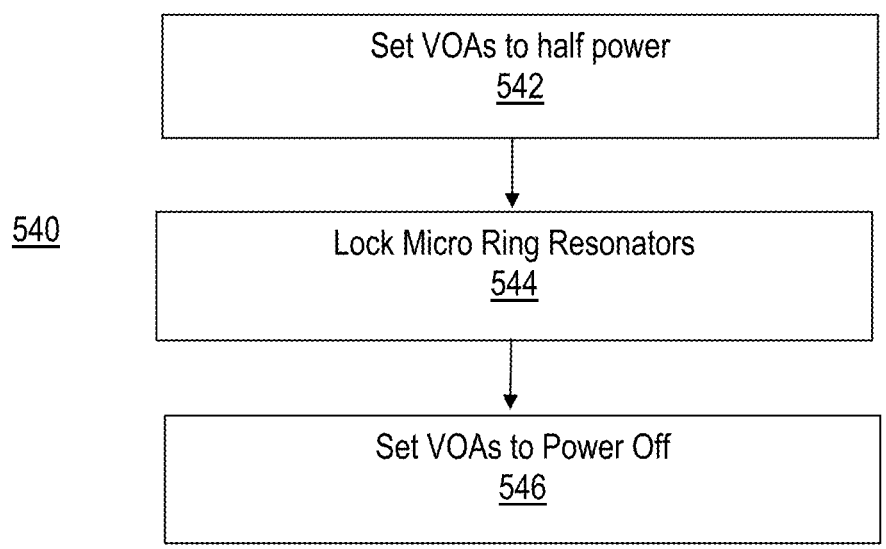
FIG. 5C illustrates an example process for configuring VOAs of a photonic WDM receiver to reduce reflectance, in accordance with some embodiments.

FIG. 5C illustrates an example process for configuring VOAs of a photonic WDM receiver to reduce reflectance, in accordance with some embodiments. Example process 540 for configuring VOAs of a photonic WDM receiver to reduce reflectance of a received multi-wavelength light beam back to its transmitter may include operations performed at blocks 542-546. Process 540 assumes the photonic WDM receiver is provided with photodetectors having micro ring resonators to filter and demux the various wavelengths for a plurality of channels.

At block 542, the VOAs are initially set to operate at half power.

At block 544, after the elapsed of an amount of time, e.g., a few micro seconds or a few controller clock cycles, the micro ring resonators are locked. The exact number of micro seconds or controller clock cycles is application dependent, and may vary from one system/circuit to another.

At block 546, the VOAs are powered off.

Figure 5D:
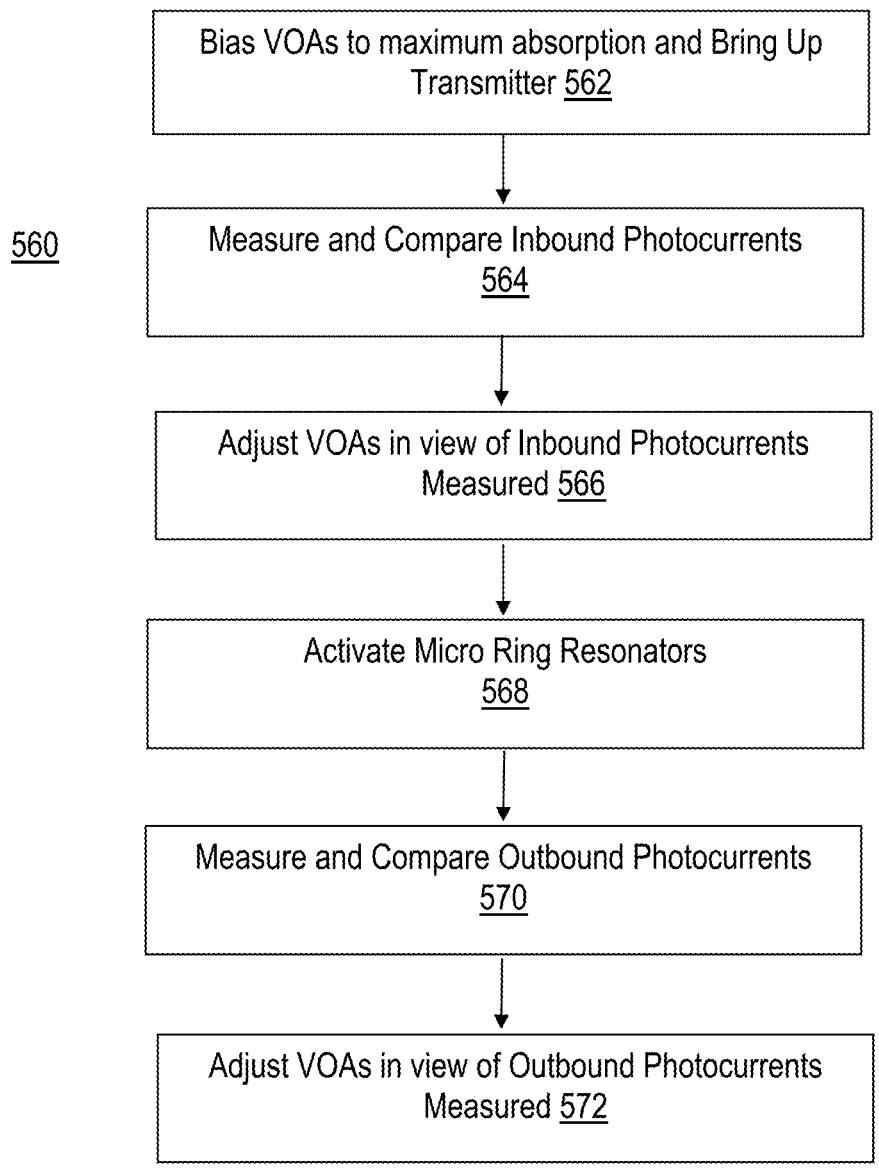
FIG. 5D illustrates another example process for configuring VOAs of a photonic WDM receiver to reduce reflectance, in accordance with some embodiments.

FIG. 5D illustrates another example process for configuring VOAs of a photonic WDM receiver to reduce reflectance, in accordance with some embodiments. Example process 560 for configuring VOAs of a photonic WDM receiver to reduce reflectance of a received multi-wavelength light beam back to its transmitter may include one or more operations performed at blocks 562-572. Process 560 also assumes the photonic WDM receiver is provided with photodetectors having micro ring resonators to filter and demux the various wavelengths for a plurality of channels. Further, process 560 assumes the photonic WDM receiver is provided with a feedback structure that is configured to provide the VOAs with the amount of photocurrents of the polarized multi-wavelength light beams.

At block 562, the VOAs are biased to maximum absorption, when the transmitter of the multi-wavelength light beam is powered up.

At block 564, the amount of photocurrents of each of the two split polarized multi-wavelength light beams in the inbound direction ($P_{in}^{TE}$ or $P_{in}^{rTm}$) is measured.

At block 566, the VOAs are adjusted in view of the amount of photocurrents of each of the two split polarized multi-wavelength light beams in the inbound direction measured.

In some embodiments, the two measurements are compared, and one or more of the VOAs are adjusted in view of the comparison. More specifically, (a) if $P_{in}^{TE}$ is greater than $P_{in}^{rTm}$, the bias of a first VOA, e.g., VOA1 412a of FIG. 4, is set to zero; and (b) if $P_{in}^{TE}$ is less than $P_{in}^{rTm}$, the bias of a second VOA, e.g., VOA2 412b of FIG. 4, is set to zero.

Under condition (a), for the illustrated example, the first polarized multi-wavelength light beam in the TE arm passes through, but no reflection, since VOA2 is blocking. Under condition (b), for the illustrated example, the second polarized multi-wavelength light beam in the rTM arm passes through, but no reflection, since VOA1 is blocking.

At block 568, after the elapse of an amount of time, e.g., a few micro seconds or a few controller clock cycles, the micro ring resonators are locked. The exact number of micro seconds or controller clock cycles is application dependent, and may vary from one system/circuit to another.

At block 570, the amount of photocurrents of each of the two split polarized multi-wavelength light beams in the outbound direction ($P_{out}^{TE}$ or $P_{out}^{rTm}$) is measured.

At block 572, one or more of the VOAs are adjusted in view of the amount of photocurrents of each of the two split polarized multi-wavelength light beams in the outbound direction measured.

In embodiments, the bias of VOA2 is gradually decreased as long as the sum of photocurrents $P_{out}^{TE}$ and $P_{out}^{TE}$ is less than a threshold. In some embodiments, the threshold may be an amount of photocurrent reflection tolerated by the transmitter. The amount of photocurrent reflection tolerated by the transmitter may vary for different products, designs or implementations.

Thus, embodiments of a photonic WDM receiver adapted to efficiently separate different wavelengths at the receiver side (de-multiplexing) for both TM and TE modes to enable scaling of many wavelengths in one optical fiber/bus has been described. Prior solutions to de-multiplex many wavelengths at the receiver for both polarizations have employed separate demux for each polarization. TE and TM waves may be separated and provided to two separate linear waveguides using polarization splitter and rotator (PSR) and include separate actively controlled ring demux for each polarization to separate out different wavelengths. However, this approach suffers twice as much power consumption and control complexity on the demux of each ring/wavelength.

Prior solutions have also attempted to use linear waveguide with polarization splitter rotator and combiner (PSRC). In this approach, first the polarization of the lasers is split and then the TM is rotated to TE and then combined with the TE arm using actively controlled circuit. The resultant waves are then directed to a linear waveguide and each wavelength is selected using single ring demux for TE and TM. The disadvantage of this technique is that the PSRC requires active control which increases the power consumption as well as electronic complexities. Additionally, the noise on the receiver side is very sensitive to the quality of the control that increases the complexity of the control electronics. Furthermore, the PSRC imposes more optical loss which then needs to be compensated for by increasing the transmitter power (hence more optical power requirement).

Prior solutions have also used looped waveguides. This approach splits the polarization into two paths using PSR and diverts different path of the same wavelength to the same photodiode using a looped waveguide. The significant disadvantage of this approach is that the loop geometry effectively acts as a reflector when not properly locked and reflects all of the lasers back to the transmitter that potentially causes instability and catastrophic failures of the transmitter.

Figure 6:
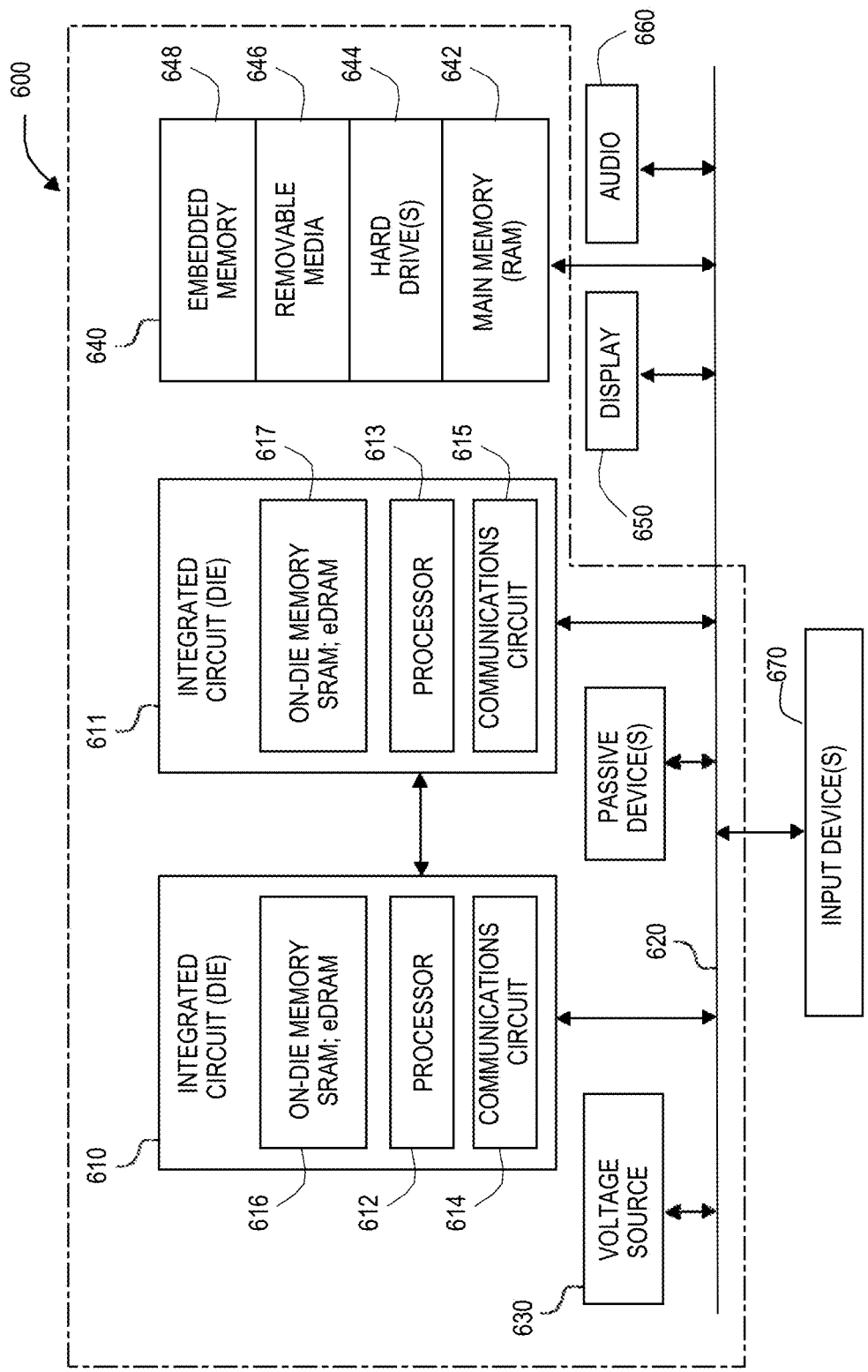
FIG. 6 schematically illustrates an example computer system incorporated with the present disclosure, in accordance with some embodiments.

Referring now to FIG. 6, which schematically illustrates an example computing device incorporated with the teachings of the present disclosure, in accordance with some embodiments. Computer system 600 (also referred to as the electronic system 600) as depicted can embody an optical receiver IC, in particular, having a photonic WDM receiver, according to any of the several disclosed embodiments and their equivalents as set forth in this disclosure. In particular, one or more of the communication circuits 614, 615 may embody an optical receiver IC. The optical receiver IC may be part of an optical transceiver IC, which in turn may be part of an optical engine. The optical engine may be coupled to an IC package having a SOC via a bridge or integrated with the IC package having the SOC, described more fully below with references to FIGS. 7A and 7B. The computer system 600 may be a mobile device such as a netbook computer. The computer system 600 may be a mobile device such as a wireless smart phone. The computer system 600 may be a desktop computer. The computer system 600 may be a hand-held reader. The computer system 600 may be a server system. The computer system 600 may be a supercomputer or high-performance computing system.

In an embodiment, the electronic system 600 is a computer system that includes a system bus 620 to electrically and/or optically couple the various components of the electronic system 600. The system bus 620 is a single bus or any combination of busses according to some embodiments. The electronic system 600 includes a voltage source 630 that provides power to the integrated circuit 610. In some embodiments, the voltage source 630 supplies current to the integrated circuit 610 through the system bus 620.

The integrated circuit 610 is electrically and/or optically coupled to the system bus 620 and includes any circuit, or combination of circuits according to an embodiment. In an embodiment, the integrated circuit 610 includes a processor 612 that can be of any type. As used herein, the processor 612 may mean any type of circuit such as, but not limited to, a SOC, a microprocessor, a microcontroller, a graphics processor, a digital signal processor, or another processor. In an embodiment, SRAM embodiments are found in memory caches of the processor. Other types of circuits that can be included in the integrated circuit 610 are a custom circuit or an application-specific integrated circuit (ASIC) for use in wireless devices such as cellular telephones, smart phones, pagers, portable computers, two-way radios, and similar electronic systems, or a communications circuit for servers. In an embodiment, the integrated circuit 610 includes on-die memory 616 such as static random-access memory (SRAM). In an embodiment, the integrated circuit 610 includes embedded on-die memory 616 such as embedded dynamic random-access memory (eDRAM).

In an embodiment, the integrated circuit 610 is complemented with a subsequent integrated circuit 611. Useful embodiments include a dual processor 613 and a dual communications circuit 615 and dual on-die memory 617 such as SRAM. In an embodiment, the dual integrated circuit 610 includes embedded on-die memory 617 such as eDRAM.

In an embodiment, the electronic system 600 also includes an external memory 640 that in turn may include one or more memory elements suitable to the particular application, such as a main memory 642 in the form of RAM, one or more hard drives 644, and/or one or more drives that handle removable media 646, such as diskettes, compact disks (CDs), digital versatile disks (DVDs), flash memory drives, and other removable media known in the art. The external memory 640 may also be embedded memory 648 such as the first die in a die stack, according to an embodiment.

In an embodiment, the electronic system 600 also includes a display device 650, an audio output 660. In an embodiment, the electronic system 600 includes an input device such as a controller 670 that may be a keyboard, mouse, trackball, game controller, microphone, voice-recognition device, or any other input device that inputs information into the electronic system 600. In an embodiment, an input device 670 is a camera. In an embodiment, an input device 670 is a digital sound recorder. In an embodiment, an input device 670 is a camera and a digital sound recorder.

As shown herein, the integrated circuit 610 and/or 611 can be implemented in a number of different embodiments, including a package having an optical transceiver IC, according to any of the several disclosed embodiments and their equivalents, one or more methods of fabricating an integrated circuit, and one or more methods of fabricating an electronic assembly that includes an optical transceiver, according to any of the several disclosed embodiments as set forth herein and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed optical transceivers with an isolator and compensator unit and their equivalents. A foundation multi-layer PCB may be included, as represented by the dashed line of FIG. 6. Passive devices may also be included, as is also depicted in FIG. 6.

Referring now to FIGS. 7A and 7B, wherein example embodiments of packaging the photonic WDM receiver of the present disclosure, according to some embodiments, are illustrated. As illustrated, photonic WDM receiver 710 or 730 may be integrated as part of optical engine 708 or 728 respectively. Photonic WDM receiver 710 or 730 may be coupled with optical fibers 712 or 732 respectively. Optical engine 708 or 728 may be disposed on PCB 714 or 734 respectively.

For the embodiments of FIG. 7A, optical engine 708 may be coupled to a package 702 via a bridge 716. Package 702 may include substrate 704 having one or more circuit elements 706 disposed thereon (for simplicity, one shown). One or more circuit elements 706 may include one or more processors, e.g., a central processing unit (CPU) or a graphical processing unit (GPU), with or without auxiliary programmable circuits such as Filed Programmable Gate Arrays (FPGA), memory, and so forth. In embodiments, the one or more circuit elements 706 may be a system-on-chip (SOC) having the CPU and/or GPU (with or without the FPGA), memory and so forth.

For the embodiments of FIG. 7B, optical engine 728 may be integrated into a package 722 co-disposed on substrate 724 with one or more circuit elements 726. Similarly, one or more circuit elements 726 may include one or more processors, e.g., a central processing unit (CPU) or a graphical processing unit (GPU), with or without auxiliary programmable circuits such as Filed Programmable Gate Arrays (FPGA), memory, and so forth. In embodiments, the one or more circuit elements 706 may be a system-on-chip (SOC) having the CPU and/or GPU (with or without the FPGA), memory and so forth.

Figure 8:
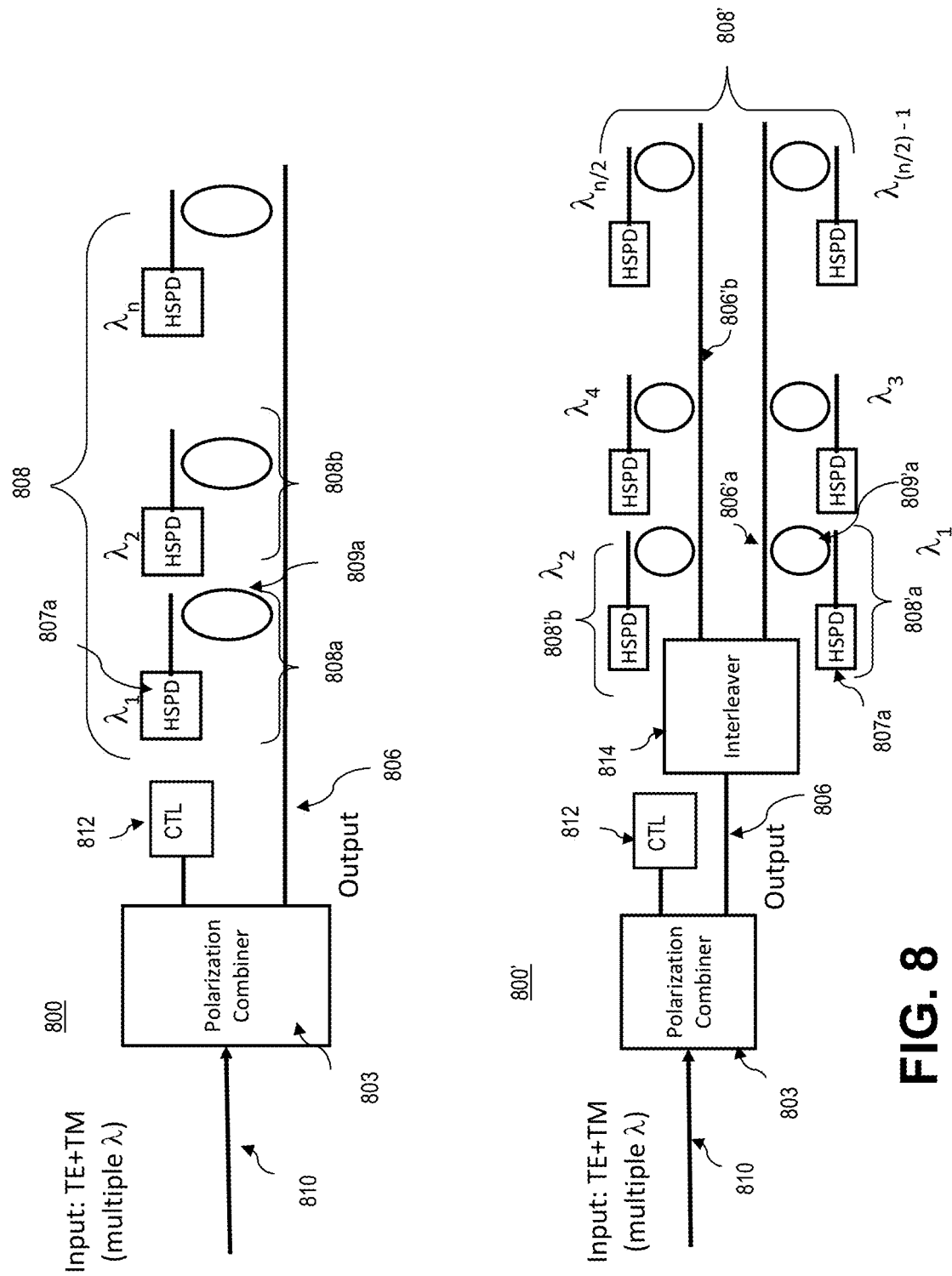
FIG. 8 illustrates additional example photonic WDM receivers with polarization diversity, in accordance with some embodiments.

Referring now to FIG. 8, wherein additional example photonic WDM receivers with polarization diversity, in accordance with some embodiments, are shown. As illustrated in the upper portion of FIG. 8, example photonic WDM receiver 800, in accordance with some embodiments, includes a fiber coupler (not shown), a polarization combiner 803, control circuitry 812, a plurality of photodetectors 808a, 808b et al (collectively, 808), and waveguide 806, optically coupled with each other as shown. In embodiments, the photonic WDM receiver 800 is a silicon photonic WDM receiver disposed in a silicon package. The lower portion of FIG. 8 illustrates alternate embodiments of example photonic WDM receiver 800'. Similar to photonic WDM receiver 800, photonic WDM receiver 800' also includes a fiber coupler (not shown), a polarization combiner 803, control circuitry 812, a plurality of photodetectors 808'a, 808'b et al (collectively, 808'), and waveguides 806', optically coupled with each other as shown. However, photonic WDM receiver 800' differs from photonic WDM receiver 800 in that photonic WDM receiver 800' further includes interleaver 814, and in the arrangements of photodetectors 808' and waveguides 806'. Photonic WDM receiver 800 includes a single waveguide 806 to serially couple the light beam outputted from polarization combiner 803 to a row of serially disposed photodetectors 808, whereas for photonic WDM receiver 800', interleaver 814 interleaves the wavelengths of the light beam outputted from polarization combiner 803 to two rows of serially disposed photodetectors 808'. In embodiments, the photonic WDM receiver 800' is a silicon photonic WDM receiver disposed in a silicon package.

For both embodiments, the coupler (not shown) is arranged to couple a multi-wavelength light beam 810 from a fiber to polarization combiner 803. Multi-wavelength light beam 810 has data encoded in a plurality of wavelengths (n) for a plurality of channels. Polarization combiner 803 is arranged to split multi-wavelength light beam 810 into a first polarized multi-wavelength light beam and a second polarized multi-wavelength light beam, and recombine the beams back into one phase adjusted/aligned polarized multi-wavelength light beam, prior to outputting the adjusted/aligned polarized multi-wavelength light beam via a first of its outputs onto waveguide 106. In embodiments, polarization combiner 803 is arranged to output the adjusted/aligned polarized multi-wavelength light beam with reduced/minimum phase differences between the various wavelengths. In embodiments, polarization combiner 803 further includes a second output to control circuitry (CTL) 812. In embodiments, polarization combiner 803 is arranged to output no signal to CTL 812 while outputting the adjusted/aligned polarized multi-wavelength light beam via the first output onto waveguide 106. In embodiments, CTL 812 may comprise one or more photodetectors to monitor and detect the output at the second output of polarization combiner 803 and provide control signals to control the operation of photonic WDM receiver 800/800'.

Figure 9:
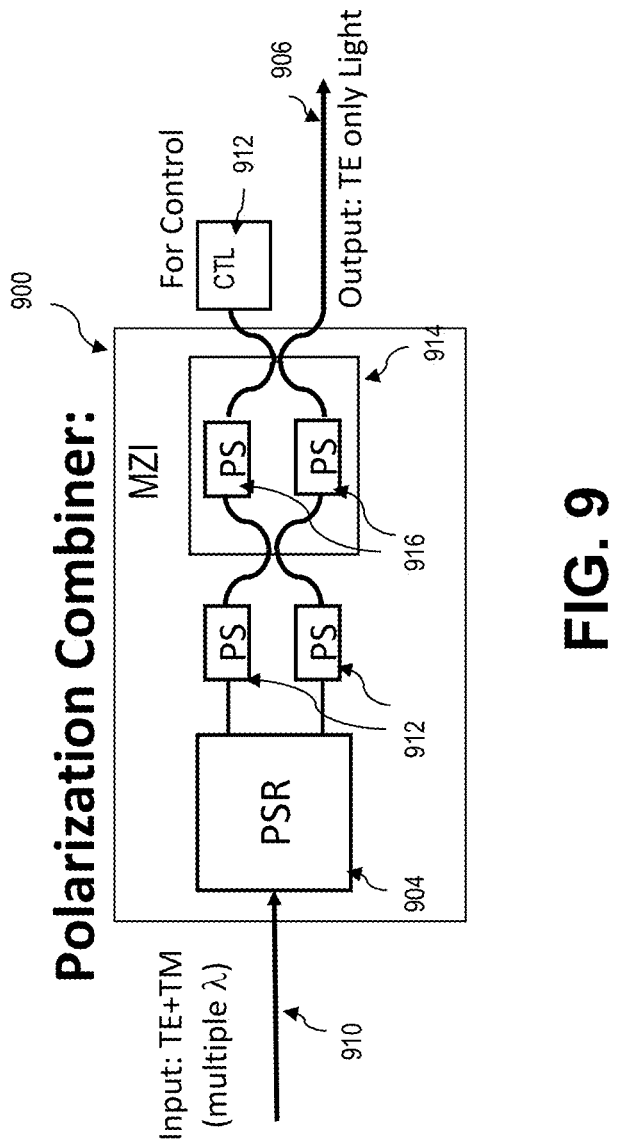
FIG. 9 illustrates an example polarization combiner, in accordance with some embodiments.

Referring now also to FIG. 9, wherein an example polarization combiner, according to some embodiments, is shown. As shown, for the illustrated embodiments, polarization combiner 900, which may be polarization combiner 803 of FIG. 8, includes a polarization splitter rotator (PSR) 904, a plurality of phase shifters (PS) 912, and a Mach-Zehnder interferometer (MZI) 914, coupled to each other as shown. PSR 904 is arranged to split multi-wavelength light beam 910 into a TE polarized multi-wavelength light beam and a rotated TM polarized multi-wavelength light beam for the plurality of PS 912. PS 912 are arranged to adjust/align the TE and rotate TM polarized multi-wavelength light beams, prior to inputting the beams into MZI 914. The amount of phase shift required on PS 912 depends on the actual polarization dispersion resulted from the fiber, the coupler and PSR 904. In embodiments, the static phase difference can be subsequently compensated passively using waveguide delays in one arm.

MZI 914 is arranged to recombine the beams back into one phase adjusted/aligned polarized multi-wavelength light beam, prior to outputting the TE arm of the adjusted/aligned polarized multi-wavelength light beam via a first of its outputs onto waveguide 906 (which may be waveguides 806 of FIG. 8). In embodiments, MZI 914 comprises a plurality of PS 916, and are arranged to output the adjusted/aligned polarized multi-wavelength light beam with reduced/minimum phase differences between the various wavelengths. In embodiments, MZI 914 further includes a second output to control circuitry (CTL) 912 (which may be CTL 812 of FIG. 8). In embodiments, MZI 914 is arranged to terminate the cross output and output no signal to CTL 912 while maximizing outputting of the TE arm of the adjusted/aligned polarized multi-wavelength light beam via the first output onto waveguide 906.

Referring now back to FIG. 8, the plurality of photodetectors 808 of photonic WDM receiver 800 are serially coupled in one row to polarization combiner 803 to receive the phase adjusted/aligned polarized multi-wavelength light beam, and respectively filter the phase adjusted/aligned polarized multi-wavelength light beam for corresponding ones of the plurality of wavelengths ($\lambda_1$, $\lambda_2$, . . . $\lambda_n$) to receive the data encoded therein for the channels. The plurality of photodetectors 808' of photonic WDM receiver 800', on the other hand, are serially coupled in two rows to interleaver 814 to respectively receive different wavelength portions of the phase adjusted/aligned polarized multi-wavelength light beam, and respectively filter the phase adjusted/aligned polarized multi-wavelength light beam for corresponding ones of the plurality of wavelengths ($\lambda_1$, $\lambda_3$, . . . $\lambda_{(n/2)-1}$ in one row and $\lambda_2$, $\lambda_4$, . . . $\lambda_n$ in the other row), to receive the data encoded therein for the channels. Hence, compared with photonic WDM receiver 100/100', photonic WDM receiver 800/800' may be more power efficient, without having two set of demultiplexers for the TE and TM arms.

In embodiments, photodetectors 808 and 808' are silicon micro ring resonator complemented photodiodes. For example, photodetector 808a/808'a comprises high speed photodiode (HSPD) 807a/807'a disposed adjacent to silicon micro ring resonator 809a/809'a. In alternate embodiments, photodetector 808a/808'a may comprise HSPD 807a/807'a disposed at the center of silicon micro ring resonator 809/809'a instead. In other embodiments, photodetectors 808 and 808' may be germanium micro ring resonator complemented photodiodes instead. For these embodiments, photodetector 808a/808'a may comprise high speed photodiode (HSPD) 807a/807'a disposed adjacent to germanium micro ring resonator 809a/809'a.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

Some non-limiting examples (to provide literal support of the claims) are provided below.

EXAMPLES

Example 1 is a photonic wavelength division multiplexing, WDM, receiver with polarization diversity, comprising: a polarization splitter, PS, to split a received multi-wavelength light beam into a first polarized multi-wavelength light beam and a second polarized multi-wavelength light beam, the received multi-wavelength light beam having data encoded in a plurality of wavelengths for a plurality of channels; a plurality of photodetectors optically coupled with the PS to receive the first and second polarized multi-wavelength light beams, and respectively filter both the first and second polarized multi-wavelength light beams for corresponding ones of the plurality of wavelengths to receive the data encoded therein for the channels; and a plurality of waveguides to couple and guide the first and second polarized multi-wavelength light beams from the PS to the plurality of photodetectors, wherein the plurality of waveguides are arranged to provide the first and second polarized multi-wavelength light beams with same path lengths to each of the plurality of photodetector.

Example 2 is example 1 wherein the PS is a polarization splitter rotator, PSR.

Example 3 is example 2, wherein the first polarized multi-wavelength light beam is a first traverse electric, TE, polarized multi-wavelength light beam, and the second polarized multi-wavelength light beam is a traverse magnetic, TM, polarized multi-wavelength light beam rotated into a second TE polarized multi-wavelength light beam by the PSR.

Example 4 is any one of examples 1-3, wherein each of the photodetectors comprises a silicon micro ring resonator and photodiodes. The plurality of photodetectors may be arranged in a series. The photodiode of each photodetector may be disposed inside or outside the silicon micro ring resonator of the photodetector.

Example 5 is any one of examples 1-4, further comprising a heater thermally coupled with the PS to facilitate control of the PS.

Example 6 is any of examples 1-5, wherein the WDM receiver is a dense WDM, DWDM, receiver, wherein the received multi-wavelength light beam comprises data encoded in more than 40 wavelengths for more than 40 channels, with spacing between wavelengths that is less than 100 GHz.

Example 7 is any one of examples 1-6, wherein the WDM receiver is a receiver sub-assembly of a silicon photonic transceiver.

Example 8 is a photonic wavelength division multiplexing with polarization diversity method, comprising: receiving and splitting a multi-wavelength light beam into a first polarized multi-wavelength light beam and a second polarized multi-wavelength light beam, the received multi-wavelength light beam having data encoded in a plurality of wavelengths for a plurality of channels; guiding the first and second polarized multi-wavelength light beams over equal path lengths to each of a plurality of detection locations; and respectively filtering, at the detection locations, both the first and second polarized multi-wavelength light beams for corresponding ones of the plurality of wavelengths to receive the data encoded therein for the channels.

Example 9 is example 8, wherein guiding comprises guiding with a plurality of waveguides that provide the first and second polarized multi-wavelength light beams with the same path lengths to each of the plurality of detection locations.

Example 10 is example 8 or 9, wherein the first polarized multi-wavelength light beam is a first traverse electric, TE, polarized multi-wavelength light beam, and the second polarized multi-wavelength light beam is a traverse magnetic, TM, polarized multi-wavelength light beam rotated into a second TE polarized multi-wavelength light beam.

Example 11 is any one of examples 8-10, wherein respectively filtering comprises respectively filtering the wavelengths with silicon micro ring photodetectors at the plurality of detection locations, and receiving the encoded data for the channels, in series.

Example 12 is a photonic wavelength division multiplexing, WDM, receiver with reduced reflectance, comprising: a splitter to receive a multi-wavelength light beam from a transmitter, and split the received multi-wavelength light beam into a first multi-wavelength light beam and a second multi-wavelength light beam, the received multi-wavelength light beam having data encoded in a plurality of wavelengths for a plurality of channels; a plurality of photodetectors to respectively demux the plurality of wavelengths; a looped waveguide coupled with the splitter and the plurality of photodetectors to optically couple the first and second multi-wavelength light beams from the splitter to the plurality of photodetectors; and a first and a second variable optical attenuator, VOAs, respectively disposed at a first location of the looped waveguide between the splitter and a first of the photodetectors, and at a second location of the looped waveguide between the splitter and a second of the photodetectors to suppress reflection of the first and second multi-wavelength light beams back to the transmitter.

Example 13 is example 12, wherein the splitter is a polarization splitter rotator, PSR, and wherein the first multi-wavelength light beam is a first traverse electric, TE, polarized multi-wavelength light beam, and the second multi-wavelength light beam is a traverse magnetic, TM, polarized multi-wavelength light beam rotated into a second TE polarized multi-wavelength light beam by the PSR.

Example 14 is example 12 or 13, wherein the looped waveguide is a primary looped waveguide, and each of the plurality of photodetectors comprises a set of silicon micro ring resonator, a photodiode, and a secondary looped waveguide optically coupling the micro ring resonator and the photodiode.

Example 15 is examples 14, wherein each of the plurality of secondary loop waveguide is arranged to guide the first multi-wavelength light beam in a clockwise or counterclockwise direction, and to guide the second multi-wavelength light beam in an opposite direction.

Example 16 is any one of examples 12-15, further comprising a feedback structure having a plurality of photodiodes to respectively measure photocurrents of the first and second multi-wavelength light beams.

Example 17 is any one of examples 12-16, wherein the WDM receiver is a dense WDM, DWDM, receiver, wherein the received multi-wavelength light beam comprises data encoded in more than 40 wavelengths for more than 40 channels, with spacing between wavelengths that is less than 100 GHz.

Example 18 is any one of examples 12-17, wherein the WDM receiver is a receiver sub-assembly of a silicon photonic transceiver.

Example 19 is a photonic wavelength division multiplexing with reduced reflectance method, comprising: receiving from a transmitter a multi-wavelength light beam, and splitting the multi-wavelength light beam into a first multi-wavelength light beam and a second multi-wavelength light beam, the received multi-wavelength light beam having data encoded in a plurality of wavelengths for a plurality of channels; loop guiding the first and second multi-wavelength light beams to a plurality of detection locations; respectively demuxing, at the detection locations, the first and second multi-wavelength light beams, in parallel, for corresponding ones of the plurality of wavelengths, to receive the data encoded therein for the channels; and configuring one or more variable optical attenuator, VOAs, to suppress reflection of the first and second multi-wavelength light beams back to the transmitter.

Example 20 is example 19, wherein the first multi-wavelength light beam is a first traverse electric, TE, polarized multi-wavelength light beam, and the second multi-wavelength light beam is a traverse magnetic, TM, polarized multi-wavelength light beam rotated into a second TE polarized multi-wavelength light beam.

Example 21 is example 19 or 20, wherein respectively demuxing comprises respectively resonating, at the detection locations, the first and second multi-wavelength light beams; and wherein configuring comprises: setting one or more of the one or more VOAs to one-half attenuation power at a start up time; locking the resonating after an amount of time has elapsed since the setting; and on locking, re-setting the one or more of the one or more VOAs to zero attenuation power.

Example 22 is any one of examples 19-21, wherein configuring comprises: measuring photocurrents of the first and second multi-wavelength light beams; and configuring one or more of the one or more VOAs in view of the measured photocurrents.

Example 23 is example 22, wherein measuring comprises measuring inbound photocurrents of the first and second multi-wavelength light beams; and configuring comprises configuring one or more of the one or more VOAs in view of the measured inbound photocurrents of the first and second multi-wavelength light beams.

Example 24 is example 22 or 23, wherein measuring comprises measuring outbound photocurrents of the first and second polarized multi-wavelength light beams; and configuring comprises configuring one or more of the one or more VOAs in view of the measured outbound photocurrents of the first and second multi-wavelength light beams.

Example 25 is a system comprising an optical transceiver having any one of the photonic wavelength division multiplexing, WDM, receiver of examples 1-7.

Example 26 is a system comprising an optical transceiver having any one of the photonic wavelength division multiplexing, WDM, receiver with reduced reflectance of examples 12-18.

Example 27 is a system having an optical transceiver that practices the photonic wavelength division multiplexing with polarization diversity method of examples 8-11.

Example 28 is a system having an optical transceiver that practices photonic wavelength division multiplexing with reduced reflectance method of examples 19-24.

Example 29 is a photonic wavelength division multiplexing (WDM) receiver with polarization diversity, comprising: a polarization splitter, PS, to split a received multi-wavelength light beam into a first polarized multi-wavelength light beam and a second polarized multi-wavelength light beam, the received multi-wavelength light beam having data encoded in a plurality of wavelengths for a plurality of channels; a plurality of photodetectors optically coupled with the PS to receive the first and second polarized multi-wavelength light beams, and respectively filter both the first and second polarized multi-wavelength light beams for corresponding ones of the plurality of wavelengths to receive the data encoded therein for the channels; and a looped waveguide coupled with the splitter and the plurality of photodetectors to optically couple the first and second multi-wavelength light beams from the splitter to the plurality of photodetectors, wherein the looped waveguide is a primary looped waveguide, and each of the plurality of photodetectors comprises a set of silicon micro ring resonator, a photodiode, and a secondary looped waveguide optically coupling the micro ring resonator and the photodiode.

Example 30 is example 29, wherein the splitter is a polarization splitter rotator, PSR, and wherein the first multi-wavelength light beam is a first traverse electric, TE, polarized multi-wavelength light beam, and the second multi-wavelength light beam is a traverse magnetic, TM, polarized multi-wavelength light beam rotated into a second TE polarized multi-wavelength light beam by the PSR.

Example 31 is example 29, wherein each of the plurality of secondary loop waveguide is arranged to guide the first multi-wavelength light beam in a clockwise or counterclockwise direction, and to guide the second multi-wavelength light beam in an opposite direction.

Example 32 is example 29, wherein the primary looped waveguide and each of the plurality of secondary loop waveguide are arranged to provide the first and second multi-wavelength light beams with same path lengths to each of the plurality of photodiode.

Example 33 is a photonic wavelength division multiplexing, WDM, receiver with polarization diversity, comprising: a polarization combiner to receive a multi-wavelength light beam with polarization diversity having data encoded in a plurality of wavelengths for a plurality of channels, process the received multi-wavelength light beam with polarization diversity and output a polarized multi-wavelength light beam; a plurality of photodetectors optically coupled with the polarization combiner to receive the polarized multi-wavelength light beam, and respectively filter the polarized multi-wavelength light beam for corresponding ones of the plurality of wavelengths to receive the data encoded therein for the channels; and one or more waveguides to couple and guide the polarized multi-wavelength light beam from the polarization combiner to the plurality of photodetectors.

Example 34 is example 33 wherein the polarization combiner comprises a polarization splitter rotator, PSR, a plurality of phase shifters coupled to the PSR, and a Mach-Zehnder interferometer (MZI) coupled to the plurality of phase shifters.

Example 35 is example 34, wherein the PSR is to split the received multi-wavelength light beam with polarization diversity into a traverse electric, TE, polarized multi-wavelength light beam, and a traverse magnetic, TM, polarized multi-wavelength light beam rotate the TM, polarized multi-wavelength light beam.

Example 36 is any one of examples 33-35, wherein the plurality of photodetectors are serially disposed in one row.

Example 37 is any one of examples 33-35, further comprising an interleaver coupled to the polarization combiner, and wherein the plurality of photodetectors are serially disposed in two rows, and coupled to the interleaver.

Example 38 is any one of examples 33-37, wherein each of the photodetectors comprises a silicon micro ring resonator and photodiodes. The photodiode of each photodetector may be disposed inside or outside the silicon micro ring resonator of the photodetector.

We claim:

1. A photonic wavelength division multiplexing (WDM) receiver with polarization diversity, comprising:
   a polarization splitter (PS) to split a received multi-wavelength light beam into a first polarized multi-wavelength light beam and a second polarized multi-wavelength light beam, the received multi-wavelength light beam having data encoded in a plurality of wavelengths for a plurality of channels;
   a plurality of micro-ring resonators arranged in a series, wherein each micro-ring resonator of the plurality of micro-ring resonators is optically coupled with the PS to receive the first and second polarized multi-wavelength light beams, and respectively filter both the first and second polarized multi-wavelength light beams for corresponding ones of the plurality of wavelengths to receive the data encoded therein for the channels, wherein respective micro-ring resonators of the plurality of micro-ring resonators have an associated photodiode; and
   a plurality of waveguides to couple and guide the first and second polarized multi-wavelength light beams from the PS to the plurality of micro-ring resonators, wherein the plurality of waveguides are arranged to provide the first and second polarized multi-wavelength light beams with same path lengths to each of the plurality of micro-ring resonators.

2. The WDM receiver of claim 1 wherein the PS is a polarization splitter rotator (PSR).

3. The WDM receiver of claim 2, wherein the first polarized multi-wavelength light beam is a first traverse electric (TE), polarized multi-wavelength light beam, and the second polarized multi-wavelength light beam is a traverse magnetic (TM), polarized multi-wavelength light beam rotated into a second TE polarized multi-wavelength light beam by the PSR.

4. The WDM receiver of claim 1, further comprising a heater thermally coupled with the PS to facilitate control of the PS.

5. The WDM receiver of claim 1, wherein the WDM receiver is a dense WDM receiver, wherein the received multi-wavelength light beam comprises data encoded in more than 40 wavelengths for more than 40 channels, with spacing between wavelengths that is less than 100 GHz.

6. The WDM receiver of claim 1, wherein the WDM receiver is a receiver sub-assembly of a silicon photonic transceiver disposed in a silicon package.

7. The WDM receiver of claim 1, wherein each micro-ring resonator of the plurality of micro-ring resonators is coupled at one side to receive the first polarized multi-wavelength light beam and at an opposing side to receive the second polarized multi-wavelength light beam.

8. A photonic wavelength division multiplexing with polarization diversity method, comprising:
   receiving and splitting a multi-wavelength light beam into a first polarized multi-wavelength light beam and a second polarized multi-wavelength light beam, the received multi-wavelength light beam having data encoded in a plurality of wavelengths for a plurality of channels;
   guiding the first and second polarized multi-wavelength light beams over equal path lengths to a first micro-ring resonator of a plurality of micro-ring resonators and a second micro-ring resonator of the plurality of micro-ring resonators, wherein the first and second polarized multi-wavelength light beams arrive at the first micro-ring resonator at a first time, wherein the first and second polarized multi-wavelength light beams arrive at the second micro-ring resonator at a second time, and wherein the second time is after the first time; and
   respectively filtering, at the first and second micro-ring resonators, both the first and second polarized multi-wavelength light beams for corresponding ones of the plurality of wavelengths to receive the data encoded therein for the channels.

9. The method of claim 8, wherein guiding comprises guiding with a plurality of waveguides that provide the first and second polarized multi-wavelength light beams with the same path lengths to respective ones of the plurality of micro-ring resonators.

10. The method of claim 8, wherein the first polarized multi-wavelength light beam is a first traverse electric (TE) polarized multi-wavelength light beam, and the second polarized multi-wavelength light beam is a traverse magnetic (TM) polarized multi-wavelength light beam rotated into a second TE polarized multi-wavelength light beam.

11. The method of claim 8, wherein respective micro-ring resonators of the plurality of micro-ring resonators have an associated photodiode.

12. A photonic wavelength division multiplexing (WDM) receiver with reduced reflectance, comprising:
   a splitter to receive a multi-wavelength light beam from a transmitter, and split the received multi-wavelength light beam into a first multi-wavelength light beam and a second multi-wavelength light beam, the received multi-wavelength light beam having data encoded in a plurality of wavelengths for a plurality of channels;
   a plurality of photodetectors to respectively demultiplex the plurality of wavelengths;
   a looped waveguide coupled with the splitter and the plurality of photodetectors to optically couple the first and second multi-wavelength light beams from the splitter to the plurality of photodetectors;
   first and second variable optical attenuators (VOAs), respectively disposed at a first location of the looped waveguide between the splitter and a first of the photodetectors, and at a second location of the looped waveguide between the splitter and a second of the photodetectors to suppress reflection of the first and second multi-wavelength light beams back to the transmitter; and a feedback structure having a plurality of photodiodes to respectively measure photocurrents of the first and second multi-wavelength light beams.

13. The WDM receiver of claim 12, wherein the splitter is a polarization splitter rotator (PSR) and wherein the first multi-wavelength light beam is a first traverse electric (TE) polarized multi-wavelength light beam, and the second multi-wavelength light beam is a traverse magnetic (TM) polarized multi-wavelength light beam rotated into a second TE polarized multi-wavelength light beam by the PSR.

14. The WDM receiver of claim 13, wherein the looped waveguide is a primary looped waveguide, and each of the plurality of photodetectors comprises a set of silicon micro-ring resonator, a photodiode, and a secondary looped waveguide optically coupling the micro-ring resonator and the photodiode.

15. The WDM receiver of claim 14, wherein each of the secondary looped waveguides is arranged to guide the first multi-wavelength light beam in a clockwise or counterclockwise direction, and to guide the second multi-wavelength light beam in an opposite direction.

16. The WDM receiver of claim 12, wherein the WDM receiver is a dense WDM receiver, wherein the received multi-wavelength light beam comprises data encoded in more than 40 wavelengths for more than 40 channels, with spacing between wavelengths that is less than 100 GHz.

17. The WDM receiver of claim 12, wherein the WDM receiver is a receiver sub-assembly of a silicon photonic transceiver disposed in a silicon package.

18. A photonic wavelength division multiplexing with reduced reflectance method, comprising:
receiving from a transmitter a multi-wavelength light beam, and splitting the multi-wavelength light beam into a first multi-wavelength light beam and a second multi-wavelength light beam, the received multi-wavelength light beam having data encoded in a plurality of wavelengths for a plurality of channels;
loop guiding the first and second multi-wavelength light beams to a plurality of detection locations;
respectively demultiplexing, at the detection locations, the first and second multi-wavelength light beams, in parallel, for corresponding ones of the plurality of wavelengths, to receive the data encoded therein for the channels; and
configuring one or more variable optical attenuators (VOAs) to suppress reflection of the first and second multi-wavelength light beams back to the transmitter, wherein configuring includes measuring photocurrents of the first and second multi-wavelength light beams, and configuring one or more of the one or more VOAs in view of the measured photocurrents.

19. The method of claim 18, wherein the first multi-wavelength light beam is a first traverse electric (TE) polarized multi-wavelength light beam, and the second multi-wavelength light beam is a traverse magnetic (TM) polarized multi-wavelength light beam rotated into a second TE polarized multi-wavelength light beam.

20. The method of claim 18, wherein respectively demultiplexing comprises respectively resonating, at the detection locations, the first and second multi-wavelength light beams; and wherein configuring comprises:
setting one or more of the one or more VOAs to one-half attenuation power at a start-up time;
locking the resonating after an amount of time has elapsed since the setting; and
on locking, re-setting the one or more of the one or more VOAs to zero attenuation power.

21. The method of claim 18, wherein measuring comprises measuring inbound photocurrents of the first and second multi-wavelength light beams; and
configuring comprises configuring one or more of the one or more VOAs in view of the measured inbound photocurrents of the first and second multi-wavelength light beams.

22. The method of claim 18, wherein measuring comprises measuring outbound photocurrents of the first and second polarized multi-wavelength light beams; and configuring comprises configuring one or more of the one or more VOAs in view of the measured outbound photocurrents of the first and second multi-wavelength light beams.

* * * * *

UNITED STATES PATENT AND TRADEMARK OFFICE
CERTIFICATE OF CORRECTION

| | |
|---|---|
| PATENT NO. | : 12,222,552 B2 |
| APPLICATION NO. | : 17/133347 |
| DATED | : February 11, 2025 |
| INVENTOR(S) | : Duanni Huang et al. |

Page 1 of 1

It is certified that error appears in the above-identified patent and that said Letters Patent is hereby corrected as shown below:

In the Specification

Column 19
Line 55 "electric (TE), polarized multi-wavelength light beam, and" should read --electric (TE) polarized multi-wavelength light beam, and--
Line 57 "traverse magnetic (TM), polarized multi-wavelength light" should read --traverse magnetic (TM) polarized multi-wavelength light--

Column 22
Line 36 "second polarized multi-wavelength light beams…" should read --second multi-wavelength light beams…--

Signed and Sealed this
Twenty-sixth Day of August, 2025

Coke Morgan Stewart
*Acting Director of the United States Patent and Trademark Office*